United States Patent [19]
Volk, Jr.

[11] 3,993,940
[45] Nov. 23, 1976

[54] LATCHING SYSTEM FOR TWO-PHASE REVERSIBLE MOTOR

[75] Inventor: Joseph A. Volk, Jr., Florissant, Mo.

[73] Assignee: Borg-Warner Corporation, Chicago, Ill.

[22] Filed: Dec. 26, 1974

[21] Appl. No.: 536,498

[52] U.S. Cl. .......................... 318/207 B; 318/227; 318/267; 318/468
[51] Int. Cl.² .......................................... H02P 1/42
[58] Field of Search ............ 318/207 R, 207 B, 227, 318/266, 267, 468

[56] References Cited
UNITED STATES PATENTS

| | | | |
|---|---|---|---|
| 3,302,085 | 1/1967 | Hulls et al. .................... | 318/207 R |
| 3,568,019 | 3/1971 | Hirokawa et al. ............... | 318/207 B |
| 3,800,201 | 3/1974 | Gaul et al. ..................... | 318/207 B |
| 3,896,355 | 7/1975 | Guicheteau .................... | 318/207 B |

*Primary Examiner*—Gene Z. Rubinson
*Attorney, Agent, or Firm*—James E. Tracy

[57] ABSTRACT

By actuating a momentary contact switch, an energizing circuit applies an AC voltage directly to one of the two field windings of a two-phase reversible AC induction motor to drive that motor in one of its two directions. As the motor begins to rotate, the shifted phase voltage appearing at the other field winding has a relatively high magnitude and this is employed to energize a neon photo coupler which then completes a holding or latching circuit for maintaining the motor energized so that it continues to rotate. If the motor stalls or if its rotation is purposely stopped, which may be caused by a limit-of-travel switch actuated by apparatus driven by the motor, the magnitude of the shifted phase voltage decreases and the neon photo coupler de-energizes, thereby disabling the holding circuit. By actuating another momentary contact switch, motor rotation in the opposite direction occurs and another holding circuit effects continued motor rotation until the motor stalls or is purposely stopped.

12 Claims, 1 Drawing Figure

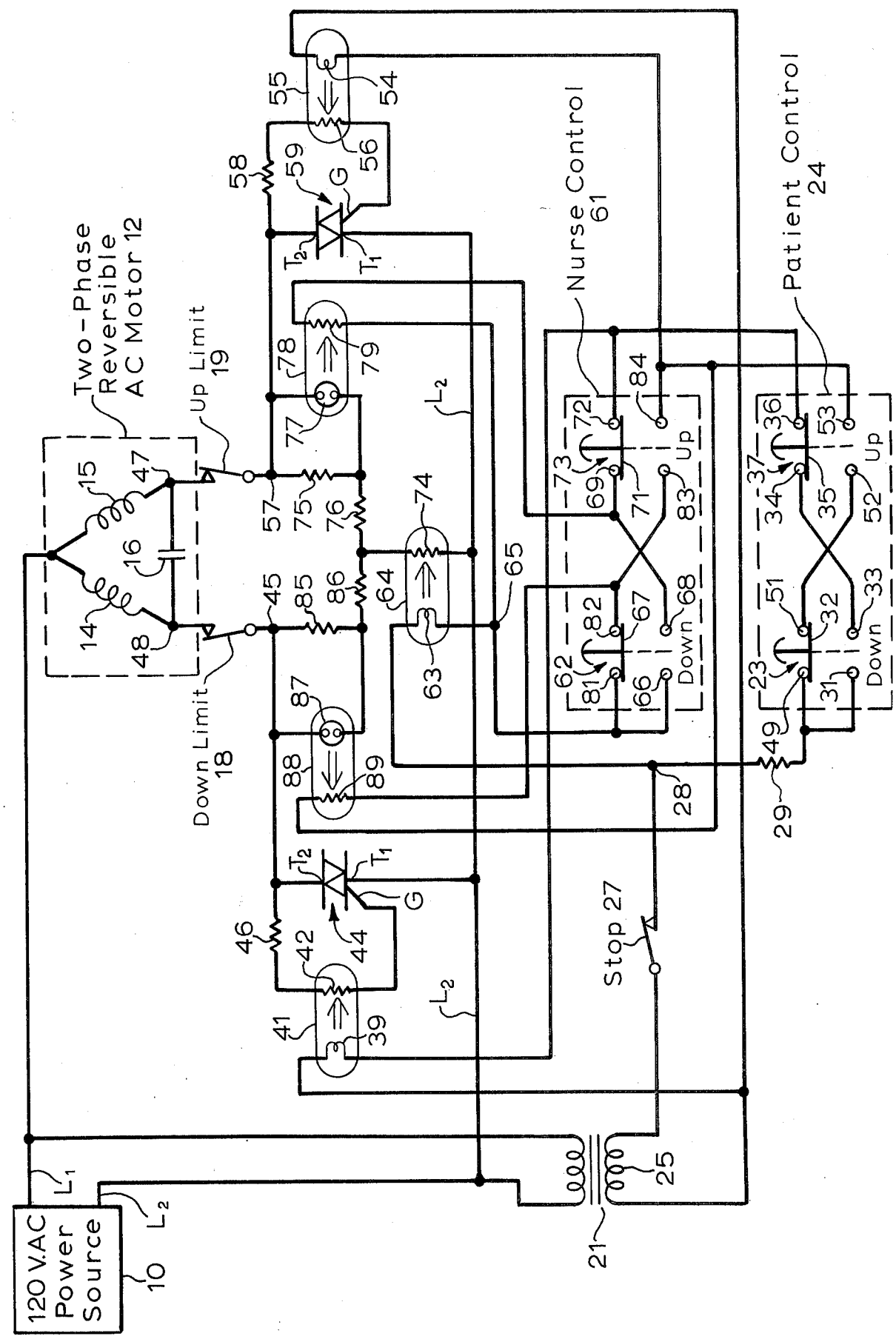

LATCHING SYSTEM FOR TWO-PHASE REVERSIBLE MOTOR

BACKGROUND OF THE INVENTION

This invention relates generally to a control circuit for an AC motor and particularly to a latching system for maintaining a two-phase reversible AC induction motor rotating selectively in either direction. While the invention may be employed with any two-phase reversible motor, it is especially attractive when used in conjunction with the motor-drive system in an adjustable motorized hospital bed and will be described in that environment.

A motor operated hospital bed usually includes a hand-held, push button-actuated control device for permitting the patient occupying the bed to remotely control various adjustments of the bed merely by selectively depressing different spring-loaded push buttons. Ordinarily, the mattress-supporting structure of the bed is articulated, being divided into four interconnected sections or panels, namely a back section, a center or seat section, an upper knee or thigh section, and a lower knee or foot section. One motor-driven adjustment that may be controlled by the patient raises or lowers the two knee sections where they join together, thereby controlling the position of the patient's knees. Another adjustment, under the patient's control, pivots or tilts the back section with respect to the center section so that the patient's back and head may be raised or lowered. A third motor-driven adjustment may be controlled by the hand-held, push button-actuated control device to vertically adjust the entire mattress-supporting frame.

On some adjustable hospital beds, a duplicate set of push buttons are mounted on a control panel, called a "nurse station", on the bed's foot board in order that a nurse or attendant can conveniently control the same adjustments or functions that are controllable with the patient's hand-held device. The switches actuated by the patient are of the momentary contact type which requires the patient to maintain continuous pressure on the selected spring-loaded push button until the desired bed position is reached. Preferably, for the most efficient operation the push buttons at the nurse station should not necessitate continuous actuation by the nurse. This is especially preferred for the high-low control that varies the vertical level of the mattress support. Quite often the bed is vertically adjusted by the nurse to either its highest position obtainable or its lowest position obtainable. As an important time-saving feature for the nurse, each of those extreme or limit positions should be reached merely by momentarily actuating a spring-loaded push button. However, these operations should not interfere with the circuitry operated by the patient in order that he may retain the same control and is not locked out.

The desired control for both the nurse and patient is achieved, in accordance with the present invention, by a unique latching system of relatively inexpensive construction. By simply depressing a selected push button-actuated momentary contact switch, the system is latched into either an up operating mode or a down operating mode to cause the high-low motor, which will be of the two-phase reversible type, to run the mattress support to either its high or low limit.

SUMMARY OF THE INVENTION

The latching system of the invention maintains a two-phase reversible AC induction motor rotating selectively in either direction, the motor including, in delta connection, first and second field windings and a phase shift capacitor. There are first energizing means for applying an AC voltage from an AC power source to the first field winding to initiate rotation of the motor in one direction. First holding means responds to the operation of the first energizing means and to the voltage developed across the capacitor, when the motor begins to rotate in the aforementioned one direction, for maintaining the application of the AC voltage to the first field winding to effect continued motor rotation. Second energizing means applies the AC voltage from the power source to the second field winding to initiate rotation of the motor in the opposite direction. Finally, the latching system includes second holding means responsive to the operation of the second energizing means and to the voltage developed across the capacitor, when the motor begins to rotate in the opposite direction, for maintaining the application of the AC voltage to the second field winding to effect continued motor rotation.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a latching system, constructed in accordance with the invention, and the manner in which the latching system is connected to a two-phase reversible AC induction motor capable of varying the high-low adjustment of a hospital bed.

DESCRIPTION OF THE ILLUSTRATED EMBODIMENT

Block 10 represents a conventional AC power supply or source providing a single-phase alternating voltage having a magnitude of approximately 120 volts RMS and a commutating frequency of 60 cycles per second or hertz. This AC voltage is usually available at a wall outlet in any hospital room where an adjustable hospital bed is located. As a safety precaution, however, it is preferred that the AC voltage available at the wall outlet be channeled through an isolation transformer with a 1:1 turns ratio before it is delivered to the output terminals of power source 10. In this way, the hospital bed's control circuitry is electrically isolated from the main AC power supply of the building. The instantaneous voltage at the output terminal connected to conductor $L_1$ will alternate in generally sinusoidal fashion above (or positive) and below (or negative) relative to the instantaneous voltage found on conductor $L_2$.

Two-phase reversible AC induction motor 12 is of conventional construction having, in delta connection, a pair of field windings 14 and 15 and a phase shift capacitor 16. When 120 volts AC from source 10 is applied directly across field winding 14, that same voltage, except 90° phase shifted, will appear across winding 15 and the motor will rotate in a direction to effect lowering of the hospital bed's mattress-supporting structure. Conversely, when 120 volts AC is applied to winding 15 it is phase shifted 90° by capacitor 16 and applied across winding 14, with the result that the motor rotates in the opposite direction to cause elevation of the mattress supporting frame. Normally-closed down limit switch 18 is actuated by the apparatus driven by motor 12 and opens when the mattress-support reaches its lowermost limit of travel. On the other hand, normally-closed up limit switch 19 is also controlled by the apparatus driven by the motor and opens when the mattress-supporting structure ascends to its uppermost limit of travel.

Transformer 21 preferably has a turns ratio of 6:1 to reduce the 120 volts AC provided by power source 10 to around 20 volts for use in the switching circuits controlled by the patient and nurse. Of course, this provides an additional safeguard against the possibility of the patient or nurse being subject to hazardous electrical shocks.

In order to explain the operation of the control circuitry, it will initially be assumed that the patient wishes to lower the bed's mattress support. To do so he operates spring-loaded, push button-actuated momentary contact switch 23 included in patient control device 24, preferably a hand-held instrument to facilitate ease of operation for the patient. With down switch 23 actuated, the 20 volts AC produced across secondary winding 25 of transformer 21 will be applied across the following circuit: normally-closed stop switch 27, circuit junction 28, current limiting resistor 29 (whose resistance is preferably around 330 ohms), contacts 31, 32 and 33 of down switch 23, contacts 34, 35 and 36 of spring-loaded, push button-actuated momentary contact switch 37, and the light emitting device or lamp 39 of photo coupler 41. Lamp 39 illuminates and causes photo resistor 42 to exhibit a resistance sufficiently low to allow gate current to flow between gate G and main terminal $T_1$ of triac 44 via the following path: conductor $L_1$, field winding 14, limit switch 18, circuit junction 45, resistor 46 (preferably around 100 ohms), photo resistor 42, the path between the gate and terminal $T_1$ in triac 44, and conductor $L_2$. The gate current turns the triac ON to permit current flow between main terminals $T_1$ and $T_2$ in response to the voltage applied thereto and in the direction determined by the voltage's polarity. Triac 44 thus serves as a solid state switch. When it is turned ON an extremely low impedance is presented between its main terminals so that it essentially represents a closed switch, as a consequence of which junction 45 is effectively shorted to conductor $L_2$.

Hence, as long as the patient depresses push button switch 23, circuit junction 45 will be connected to conductor $L_2$ through triac 44 and the full 120 volts AC from source 10 will be applied across field winding 14 to effect motor rotation in the direction that will lower the mattress support. As the motor rotates, the shifted phase voltage across winding 15 effectively adds to the voltage across winding 14 with the result that a voltage of about 240 volts RMS is produced between circuit junction 47 and conductor $L_2$. Since there is practically no voltage drop from circuit junction 48 and through triac 44 to conductor $L_2$ while the motor rotates, the full 240 volts appears across phase shift capacitor 16. As will be seen when discussing the nurse controlled latching circuitry, this relatively high voltage across the capacitor will be used to advantage. It has no effect, however, on the patient controlled circuitry for reasons to be explained.

When the mattress support descends to the desired vertical level, the patient releases down switch 23 and allows it to return to its home position shown in the drawing. This breaks the energizing circuit for photo coupler 41 and causes triac 44 to return to its OFF condition in which a very high impedance exists between main terminals $T_1$ and $T_2$ to effectively constitute an open switch. With triac 44 turned OFF, the 120 volts AC between conductors $L_1$ and $L_2$ is removed from winding 14 and motor 12 stops its rotation. Of course, if the patient desires to lower the bed to its lower limit, he would maintain pressure on switch 23 until that position was reached, at which time down limit switch 18 would open to interrupt the energizing circuit for winding 14.

Rotation of motor 12 in the opposite direction to raise the mattress support is achieved in a similar manner. The patient merely must depress spring-loaded, push button-actuated momentary contact switch 37 which completes the following circuit across secondary winding 25: stop switch 27, junction 28, resistor 29, contacts 49, 32 and 51 of down switch 23, contacts 52, 35 and 53 of up switch 37, and the light emitting device or lamp 54 of photo coupler 55. Lamp 54 illuminates and lowers the resistance of photo resistor 56 sufficiently to cause gate current to flow over the following path: conductor $L_1$, winding 15, junction 47, up limit switch 19, circuit junction 57, resistor 58 (preferably around 100 ohms), photo resistor 56, the path between the gate G and main terminal $T_1$ of triac 59, and conductor $L_2$. Triac 59 is turned ON in response to the gate current and effectively shorts junction 57 to conductor $L_2$. As a consequence, the first full 120 volts AC across conductors $L_1$ and $L_2$ is applied to winding 15 and this causes the motor to operate in the opposite direction. The mattress-supporting structure therefore rises as long as up switch 37 remains depressed. The switch is released when the desired level is reached, whereupon the energizing circuit for lamp 54 opens thereby turning OFF triac 59 to disconnect source 10 from winding 15.

Of course, contacts of down switch 23 are included in the energizing circuit for lamp 54 and, conversely, contacts of up switch 37 are included in the energizing circuit for lamp 39 to preclude the possibility of energizing both lamps simultaneously. If the patient pushes both of the push buttons at the same time, neither lamp energizes.

Consideration will now be given to the operation of the latching circuitry controlled by the switches in nurse control 61. It is contemplated that this control will be mounted on the foot board of the hospital bed at the nurse station. The nurse-operated switches can achieve the same functions accomplished by patient control 24, but in addition are capable of latching the control system in either its down operating mode or its up operating mode. More specifically, if the nurse wishes to lower the mattress support and to latch the control system in its down operating mode so that the mattress support lowers to its lowermost limit position, she merely depresses spring-loaded, push button-actuated momentary contact switch 62. When this occurs, the following circuit is completed across secondary winding 25: stop switch 27, junction 28, lamp 63 (preferably of the incandescent type) of photo coupler 64, junction 65, contacts 66, 67 and 68 of down switch 62, contacts 69, 71 and 72 of spring-loaded, push button-actuated momentary contact switch 73, and lamp 39 of photo coupler 41. Lamp 39 lights and causes triac 44 to turn ON thereby applying the 120 volts AC voltage from power source 10 to winding 14. Motor 12 begins to rotate and, as mentioned previously, produces an AC voltage around 240 volts RMS between junction 47 and conductor $L_2$ and also across capacitor 16, since junction 48 is essentially shorted to conductor $L_2$. Meanwhile, inasmuch as incandescent lamp 63 is included in the energizing circuit for lamp 39, photo coupler 64 also energizes and causes the resistance of photo resistor 74 to decrease substantially.

The 240 volts AC between junction 47 and conductor $L_2$ will be dropped across the voltage divider made up of resistors 75 and 76 and photo resistor 74. Resistor 75 preferably has a resistance around 51K ohms and resistor 76 preferably has a resistance around 33K ohms. Since the resistance of photo resistor 74 is made relatively low by the illuminated incandescent lamp 63, the voltage dropped across resistor 75 will be sufficiently high to effect energization of neon lamp 77 in neon photo coupler 78. Of course, that neon lamp will not illuminate when the patient actuates up switch 23 inasmuch as lamp 63 will not illuminate at that time. When photo coupler 64 is de-energized, the high resistance of photo resistor 74 prevents the development of a voltage across resistor 75 of sufficient magnitude to energize neon lamp 77.

When neon lamp 77 energizes, photo resistor 79 decreases its resistance sufficiently to provide a bypass circuit path around down switch 62. In other words, the path of the energizing circuit for lamps 39 and 63 from junction 65 through contacts 66, 67 and 68 to contact 69 will now be bypassed by the low resistance path provided by photo resistor 79. Hence, a holding circuit is established when neon lamp 77 energizes and this permits the nurse to release switch 62. The system is now latched in its down operating mode and motor 12 continues to rotate to effect lowering of the mattress-supporting structure. In fact, it is not even necessary that the nurse remain at the hospital bed. One of the advantages of the invention is that it allows her to latch the system in an operating mode and then walk away, thereby saving the nurse's time. Motor 12 continues to rotate until the mattress-supporting frame reaches its lower limit of travel, whereupon down limit switch 18 opens to effect de-energization of the motor and disabling of the holding circuitry.

In the event that the nurse wishes to interrupt the latching system and stop the mattress support before it reaches its lowermost limit, she merely must actuate normally-closed stop switch 27 which will preferably be located at the nurse station. By opening the stop switch, all of the photo couplers are de-energized and the operating voltage is removed from motor 12. When the bed is latched in its down operating mode, the patient can also disable the holding circuit to stop the motor rotation. By depressing up switch 37, triac 59 will be turned ON and this will effectively short junction 57 to conductor $L_2$, thereby de-energizing neon lamp 77 and disabling the holding circuit.

Another feature of the invention resides in the operation of the latching system in the event motor 12 stalls while it is latched in an operating mode. Ordinarily, if voltage is continuously applied to a stalled motor, that motor may burn out. In accordance with a feature of the present invention, that possibility is precluded by automatically disabling the latching circuit anytime the motor ceases rotation. If the system is latched in, for example, its down mode and the motor stalls, the voltage at junction 47 immediately decreases from approximately 240 volts to 120 volts and this causes de-energization of neon lamp 77 and consequently disabling of the holding circuit. Hence, the voltage from power source 10 will be immediately removed from winding 14.

Latching of the system in its up operating mode is accomplished in similar fashion. By depressing spring-loaded, push button-actuated momentary contact switch 73 the following circuit is completed across secondary winding 25: stop switch 27, junction 28, lamp 63, junction 65, contacts 81, 67 and 82 of down switch 62, contacts 83, 71 and 84 of up switch 73, and lamp 54. Lamp 54 energizes to turn triac 59 ON thereby connecting junction 57 to conductor $L_2$. The full 120 volts AC across conductors $L_1$ and $L_2$ is thus applied to winding 15 and motor 12 begins to rotate in its direction to cause upward movement of the mattress-supporting structure. Concurrently with the energization of lamp 54, lamp 63 energizes to lower the resistance of photo resistor 74. When motor 12 rotates, approximately 240 volts AC develops between junction 48 and conductor $L_2$ and also across capacitor 16, since junction 47 will now be essentially shorted to conductor $L_2$. With photo resistor 74 exhibiting a relatively low resistance, the 240 volts capacitor voltage will be dropped primarily across resistors 85 and 86, the resistances of which are preferably 51K and 33K ohms respectively. The voltage dropped across resistor 85 will be adequate to energize neon lamp 87 of neon photo coupler 88. This in turn lowers the resistance of photo resistor 89 sufficiently to provide a bypass circuit path around contacts 83 and 84. As a result, when up switch 73 is released by the nurse and returns to its home position shown in the drawing, a holding circuit will already have been established for maintaining the energization of lamp 54. The system is thus latched in its up operating mode and the nurse need not even remain at the bedside. The mattress support will be driven automatically to its uppermost limit of travel at which time up limit switch 19 opens to de-energize motor 12 and to disable the latching system.

Of course, the invention may also be employed with a two-phase AC induction motor that is run in one direction only. If bidirectional operation is not necessary, then only one holding circuit is needed, the operation of the holding circuit being controlled by the voltage developed across the phase shift capacitor in the motor.

The invention provides, therefore, a novel latching system for holding a two-phase AC induction motor in either of its two operating modes.

While a particular embodiment of the invention has been shown and described, modifications may be made, and it is intended in the appended claims to cover all such modifications as may fall within the true spirit and scope of the invention.

I claim:

1. A latching system for maintaining a two-phase reversible AC induction motor rotating selectively in either direction, where the motor includes, in delta connection, first and second field windings and a phase shift capacitor, comprising:
   an AC power source for providing an AC voltage of predetermined magnitude;

first energizing means for applying said AC voltage from said power source to the first field winding to initiate rotation of the motor in one direction;

first holding means responsive to the operation of said first energizing means and to the voltage developed across the capacitor, when the motor begins to rotate in said one direction, for maintaining the application of said AC voltage to the first field winding to effect continued motor rotation;

second energizing means for applying said AC voltage from said power source to the second field winding to initiate rotation of the motor in the opposite direction;

and second holding means responsive to the operation of said second energizing means and to the voltage developed across the capacitor, when the motor begins to rotate in said opposite direction, for maintaining the application of said AC voltage to the second field winding to effect continued motor rotation.

2. A latching system according to claim 1 in which said first holding means is automatically disabled anytime the motor stops rotating in said one direction, and wherein said second holding means is automatically disabled anytime the motor ceases rotation in said opposite direction.

3. A latching system according to claim 1 in which the motor, when rotating in said one direction, drives an apparatus in a first direction and, when rotating in said opposite direction, drives the apparatus in a second direction, wherein a first limit switch, actuated by the apparatus, disables said first holding means and stops the motor rotation when the apparatus reaches a predetermined limit of travel in said first direction, and in which a second limit switch, actuated by the apparatus, disables said second holding means and stops the motor rotation when the apparatus reaches a predetermined limit of travel in the said second direction.

4. A latching system according to claim 1 and including switching means for effecting the application of said AC voltage to either one of the field windings to achieve motor rotation in either direction without operating either one of said holding means.

5. A latching system according to claim 1 in which said first energizing means includes a first normally-open momentary contact switch that must be closed momentarily to initiate rotation of the motor in said one direction, in which said second energizing means includes a second normally-open momentary contact switch that must be closed momentarily to initiate motor rotation in said opposite direction, wherein said first holding means provides a first bypass circuit path around said first momentary contact switch, and in which said second holding means provides a second bypass circuit path around said second momentary contact switch.

6. A latching system according to claim 5 in which said AC power source has a pair of output terminals across which said AC voltage is provided, wherein one of said output terminals is coupled to the junction of the first and second field windings, in which said first energizing means couples the other output terminal of said AC power source to the junction of the first field winding and the phase shift capacitor, and wherein said second energizing means couples said other output terminal to the junction of the second field winding and the phase shift capacitor.

7. A latching system according to claim 6 in which the magnitude of the voltage developed across the capacitor is approximately twice said predetermined magnitude of said AC voltage provided by said AC power source, wherein the capacitor voltage causes the establishment of said first bypass circuit path when the motor rotates in said one direction, and in which the capacitor voltage effects the establishment of said second bypass circuit path when the motor rotates in said opposite direction.

8. A latching system according to claim 7 in which said first bypass circuit path is established by the photo resistor of a first neon photo coupler, the neon lamp of which is energized by the capacitor voltage when the motor rotates in said one direction, and wherein said second bypass circuit path is completed by the photo resistor of a second neon photo coupler whose neon lamp is energized by the capacitor voltage when the motor rotates in said opposite direction.

9. A latching system according to claim 8 and including an incandescent photo coupler energized in response to the operation of said first energizing means to effectively condition said first neon photo coupler to respond to the capacitor voltage when the motor rotates in said one direction, said same incandescent photo coupler energizing in response to the operation of said second energizing means to effectively condition said second neon photo coupler to respond to the capacitor voltage when the motor rotates in said opposite direction.

10. A latching system according to claim 9 and including means for applying said AC voltage from said AC power source to either one of the field windings to achieve motor rotation in either direction without energizing said incandescent photo coupler, thereby preventing the operation of said neon photo couplers.

11. A latching system according to claim 9 in which the junction of said first field winding and the capacitor is coupled to said other output terminal of said AC power source through the neon lamp of said second neon photo coupler and through the photo resistor of said incandescent photo coupler, wherein the junction of said second field winding and the capacitor is coupled to said other output terminal through the neon lamp of said first neon photo coupler and through the photo resistor of said incandescent photo coupler, the incandescent lamp of which is initially energized in response to the operation of either one of said energizing means and is maintained energized by one of said neon photo couplers so long as the motor continues to rotate.

12. A latching system for maintaining a two-phase AC induction motor rotating, where the motor includes, in delta connection, first and second field windings and a phase shift capacitor, comprising:

an AC power source for providing an AC voltage;

energizing means for applying said AC voltage from said power source to the first field winding to initiate rotation of the motor;

and holding means responsive to the operation of said energizing means and to the voltage developed across the capacitor, when the motor begins to rotate, for maintaining the application of said AC voltage to the first field winding to effect continued motor rotation.

\* \* \* \* \*